United States Patent
DeLuca

(10) Patent No.: US 7,042,505 B1
(45) Date of Patent: *May 9, 2006

(54) RED-EYE FILTER METHOD AND APPARATUS

(75) Inventor: Michael J. DeLuca, Boca Raton, FL (US)

(73) Assignee: FotoNation Ireland Ltd., Galway (IL)

( * ) Notice: Subject to any disclaimer, the term of this patent is extended or adjusted under 35 U.S.C. 154(b) by 793 days.

This patent is subject to a terminal disclaimer.

(21) Appl. No.: 10/170,511

(22) Filed: Jun. 12, 2002

Related U.S. Application Data

(63) Continuation of application No. 08/947,603, filed on Oct. 9, 1997, now Pat. No. 6,407,777.

(51) Int. Cl.
*H04N 5/217* (2006.01)
*H04N 5/228* (2006.01)

(52) U.S. Cl. .................... 348/241; 348/222.1

(58) Field of Classification Search ........ 348/576–577, 348/227.1, 229.1, 370–371; 382/260, 117, 382/274–275; 396/158, 166
See application file for complete search history.

(56) References Cited

U.S. PATENT DOCUMENTS

| | | |
|---|---|---|
| 4,285,588 A | 8/1981 | Mir |
| 5,016,107 A | 5/1991 | Sasson et al. |
| 5,070,355 A | 12/1991 | Inoue et al. |
| 5,130,789 A | 7/1992 | Dobbs et al. .................. 358/75 |
| 5,202,720 A | 4/1993 | Fujino et al. |
| 5,432,863 A | 7/1995 | Benati et al. ............... 382/167 |
| 5,452,048 A | 9/1995 | Edgar |
| 5,537,516 A | 7/1996 | Sherman et al. ............ 395/109 |
| 5,748,764 A | 5/1998 | Benati et al. |
| 5,751,836 A | 5/1998 | Wildes et al. |
| 5,761,550 A | 6/1998 | Kancigor |
| 5,781,650 A | 7/1998 | Lobo et al. .................. 382/118 |
| 5,805,745 A | 9/1998 | Graf ............................ 382/291 |
| 5,862,217 A | 1/1999 | Steinberg et al. ............. 380/10 |
| 5,862,218 A | 1/1999 | Steinberg et al. ............. 380/10 |
| 5,990,973 A | 11/1999 | Sakamoto .................... 348/576 |
| 5,991,549 A | 11/1999 | Tsuchida .................... 396/158 |

(Continued)

FOREIGN PATENT DOCUMENTS

EP  0 884 694 A1  12/1998

(Continued)

OTHER PUBLICATIONS

International Search Report and Written Opinion of the International Searching Authority for PCT Application No. PCT/EP2004/008706.

(Continued)

*Primary Examiner*—Ngoc-Yen Vu
*Assistant Examiner*—Kelly Jerabek
(74) *Attorney, Agent, or Firm*—DLA Piper Rudnick Gray Cary US LLP; Andrew V. Smith

(57) ABSTRACT

A digital camera has an integral flash and a means for storing and displaying a digital image. Under certain conditions, a flash photograph taken with the camera may result in a red-eye phenomenon due to a reflection within an eye of a subject of the photograph. The digital camera has a red-eye filter which analyzes the stored image for the red-eye phenomenon and modifies the stored image to eliminate the red-eye phenomenon by changing the red area to black. The modification of the image is enabled when a photograph is taken under conditions indicative of the red-eye phenomenon. The modification is subject to anti-falsing analysis which further examines the area around the red-eye area for indicia of the eye of the subject.

68 Claims, 5 Drawing Sheets

U.S. PATENT DOCUMENTS

| | | | |
|---|---|---|---|
| 6,006,039 A | 12/1999 | Steinberg et al. | 396/57 |
| 6,009,209 A | 12/1999 | Acker et al. | 382/275 |
| 6,016,354 A | 1/2000 | Lin et al. | 382/117 |
| 6,035,072 A | 3/2000 | Read | |
| 6,134,339 A | 10/2000 | Luo | 382/115 |
| 6,151,403 A | 11/2000 | Luo | 382/117 |
| 6,172,706 B1 * | 1/2001 | Tatsumi | 348/169 |
| 6,204,858 B1 | 3/2001 | Gupta | 345/431 |
| 6,252,976 B1 | 6/2001 | Schildkraut et al. | 382/117 |
| 6,275,614 B1 | 8/2001 | Krishnamurthy et al. | 382/224 |
| 6,278,491 B1 | 8/2001 | Wang et al. | 348/370 |
| 6,292,574 B1 | 9/2001 | Schildkraut et al. | 382/117 |
| 6,407,777 B1 | 6/2002 | DeLuca | 348/576 |
| 6,429,924 B1 | 8/2002 | Milch | 355/40 |
| 6,433,818 B1 | 8/2002 | Steinberg et al. | 348/161 |
| 6,496,655 B1 | 12/2002 | Malloy Desormeaux | 396/311 |
| 6,501,911 B1 | 12/2002 | Malloy Desormeaux | 396/311 |
| 6,505,003 B1 | 1/2003 | Malloy Desormeaux | 396/429 |
| 6,510,520 B1 | 1/2003 | Steinberg et al. | 713/192 |
| 6,516,154 B1 | 2/2003 | Parulski et al. | 396/287 |
| 6,728,401 B1 * | 4/2004 | Hardeberg | 382/167 |
| 6,792,161 B1 | 9/2004 | Imaizumi et al. | |
| 2002/0041329 A1 | 4/2002 | Steinberg | 348/207 |
| 2002/0093577 A1 | 7/2002 | Kitawaki et al. | |
| 2002/0131770 A1 | 9/2002 | Meier et al. | |
| 2002/0136450 A1 | 9/2002 | Chen et al. | 382/165 |
| 2002/0141661 A1 | 10/2002 | Steinberg | 382/309 |
| 2002/0150306 A1 | 10/2002 | Baron | 382/275 |
| 2002/0159630 A1 | 10/2002 | Buzuloiu et al. | 382/165 |
| 2002/0172419 A1 | 11/2002 | Lin et al. | 382/167 |
| 2002/0176623 A1 | 11/2002 | Steinberg | 382/165 |
| 2003/0007687 A1 | 1/2003 | Nesterov et al. | 382/167 |
| 2003/0021478 A1 | 1/2003 | Yoshida | 382/195 |
| 2003/0025811 A1 | 2/2003 | Keelan et al. | 348/239 |
| 2003/0044063 A1 | 3/2003 | Meckes et al. | 382/165 |
| 2003/0044070 A1 | 3/2003 | Fuersich et al. | 382/190 |
| 2003/0044177 A1 | 3/2003 | Oberhardt et al. | 396/158 |
| 2003/0044178 A1 | 3/2003 | Oberhardt et al. | 396/158 |
| 2003/0058349 A1 | 3/2003 | Takemoto | 348/222.1 |
| 2003/0095197 A1 | 5/2003 | Wheeler et al. | 348/241 |
| 2003/0118216 A1 | 6/2003 | Goldberg | 382/115 |
| 2003/0142285 A1 | 7/2003 | Enomoto | |
| 2003/0202715 A1 | 10/2003 | Kinjo | 382/282 |
| 2004/0223063 A1 | 11/2004 | DeLuca et al. | |
| 2005/0031224 A1 | 2/2005 | Prilutsky et al. | |
| 2005/0041121 A1 | 2/2005 | Steinberg et al. | |
| 2005/0140801 A1 | 6/2005 | Prilutsky et al. | |

FOREIGN PATENT DOCUMENTS

| | | |
|---|---|---|
| EP | 0 911 759 A2 | 4/1999 |
| EP | 0 911 759 A3 | 4/1999 |
| EP | 1 293 933 A1 | 9/2001 |
| EP | 1 199 672 A2 | 4/2002 |
| EP | 1 288 858 A1 | 3/2003 |
| EP | 1 288 859 A1 | 3/2003 |
| EP | 1 288 860 A1 | 3/2003 |
| EP | 1 296 510 A | 3/2003 |
| EP | 1 429 290 A | 6/2004 |
| EP | 1 478 169 A | 11/2004 |
| JP | 4-192681 | 4/1992 |
| JP | 2000 134486 | 5/2000 |
| JP | 2002 271808 | 9/2002 |
| WO | WO 9917254 | 4/1999 |
| WO | WO 0171421 A1 | 9/2001 |
| WO | WO 02/45003 A | 6/2002 |
| WO | WO 03026278 A1 | 3/2003 |
| WO | WO 03/071484 A | 8/2003 |
| WO | WO 2005/041558 A | 5/2005 |

OTHER PUBLICATIONS

International Search Report and Written Opinion of the International Searching Authority for PCT Application No. PCT/EP2005/005033.

International Search Report and Written Opinion of the International Searching Authority for PCT Application No. PCT/EP2005/005907.

Patent Abstracts of Japan, publication No. 2000050062, application No. 10-217124, published Feb. 18, 2000.

U.S. Appl. No. 10/772,767, filed Feb. 4, 2004, inventors Michael J. DeLuca, et al.

U.S. Appl. No. 11/217,788, filed Aug. 30, 2005, inventors Eran Steinberg, et al.

* cited by examiner

RED-EYE FILTER METHOD AND APPARATUS

CROSS-REFERENCE TO RELATED APPLICATION

This application is a continuation of patent application Ser. No. 08/947,603 filed Oct. 9, 1997 now U.S. Pat. No. 6,407,777.

FIELD OF THE INVENTION

The invention relates generally to the area of flash photography, and more specifically to filtering "red-eye" from a digital camera image.

BACKGROUND OF THE INVENTION

"Red-eye" is a phenomenon in flash photography where a flash is reflected within a subject's eye and appears in a photograph as a red dot where the black pupil of the subject's eye would normally appear. The unnatural glowing red of an eye is due to internal reflections from the vascular membrane behind the retina, which is rich in blood vessels. This objectionable phenomenon is well understood to be caused in part by a small angle between the flash of the camera and the lens of the camera. This angle has decreased with the miniaturization of cameras with integral flash capabilities. Additional contributors include the relative closeness of the subject to the camera and ambient light levels.

The red-eye phenomenon can be minimized by causing the iris to reduce the opening of the pupil. This is typically done with a "pre-flash", a flash or illumination of light shortly before a flash photograph is taken. This causes the iris to close. Unfortunately, the pre-flash is an objectionable 0.2 to 0.6 seconds prior to the flash photograph. This delay is readily discernible and easily within the reaction time of a human subject. Consequently the subject may believe the pre-flash is the actual photograph and be in a less than desirable position at the time of the actual photograph. Alternately, the subject must be informed of the pre-flash, typically loosing any spontaneity of the subject captured in the photograph.

Those familiar with the art have developed complex analysis processes operating within a camera prior to invoking a pre-flash. Various conditions are monitored prior to the photograph before the pre-flash is generated, the conditions include the ambient light level and the distance of the subject from the camera. Such a system is described in U.S. Pat. No. 5,070,355 to Inoue et al. Although that invention minimizes the occurrences where a pre-flash is used, it does not eliminate the need for a pre-flash. What is needed is a method of eliminating the red-eye phenomenon with a miniature camera having an integral without the distraction of a pre-flash.

Digital cameras are becoming more popular and smaller in size. Digital cameras have several advantages over film cameras. Digital cameras eliminate the need for film as the image is digitally captured and stored in a memory array for display on a display screen on the camera itself. This allows photographs to be viewed and enjoyed virtually instantaneously as opposed to waiting for film processing. Furthermore, the digitally captured image may be downloaded to another display device such as a personal computer or color printer for further enhanced viewing. Digital cameras include microprocessors for image processing and compression and camera systems control. Nevertheless, without a pre-flash, both digital and film cameras can capture the red-eye phenomenon as the flash reflects within a subject's eye. Thus, what is needed is a method of eliminating red-eye phenomenon within a miniature digital camera having a flash without the distraction of a pre-flash.

DESCRIPTION OF A PREFERRED EMBODIMENT

Figure 1:
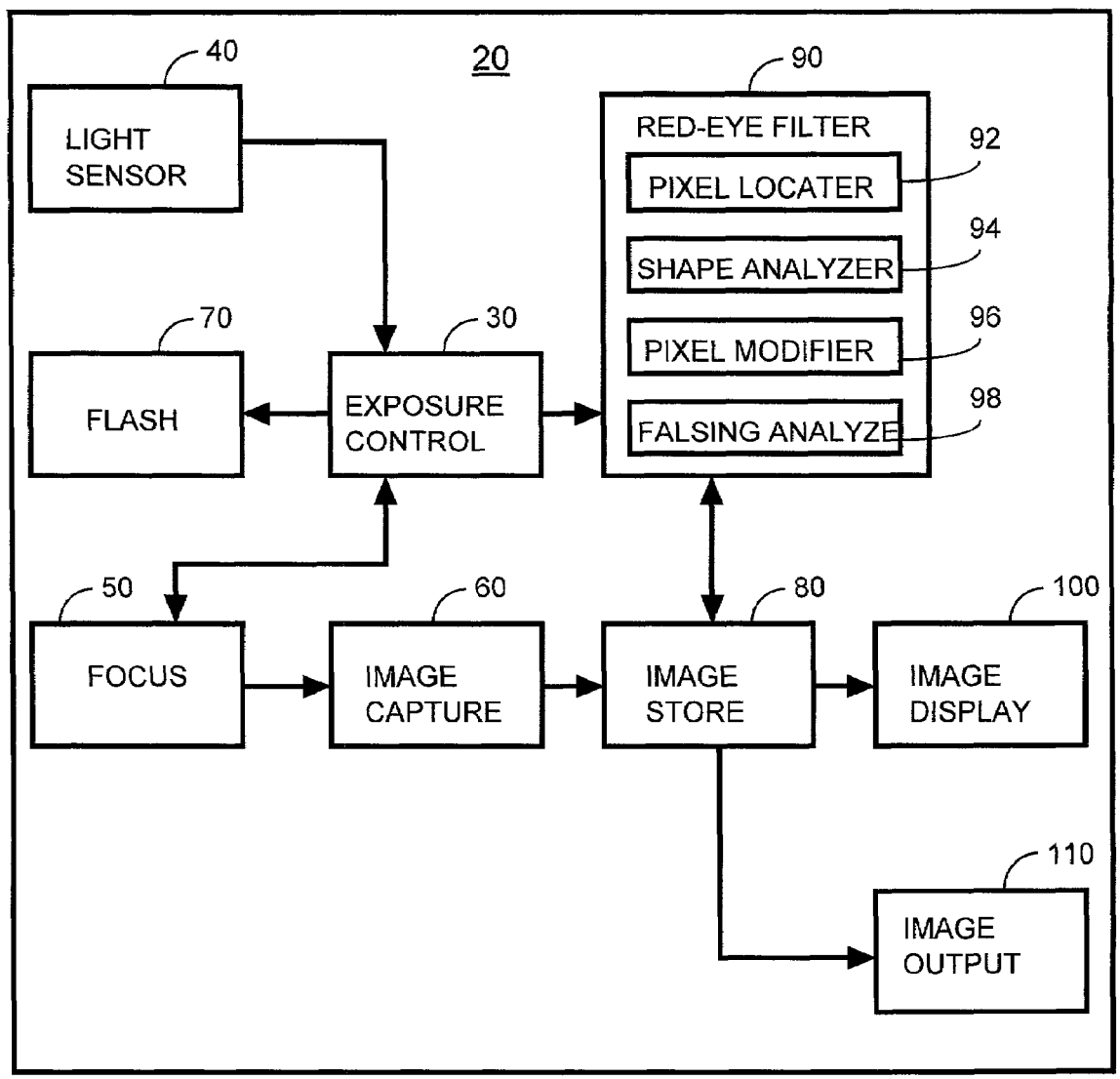
FIG. 1 shows a block diagram of a camera apparatus operating in accordance with the present invention.

FIG. 1 shows a block diagram of a camera apparatus operating in accordance with the present invention. The camera 20 includes an exposure control 30 that, in response to a user input, initiates and controls the digital photographic process. Ambient light is determined using light sensor 40 in order to automatically determine if a flash is to be used. The distance to the subject is determined using focusing means 50 which also focuses the image on image capture means 60. The image capture means digitally records the image in color. The image capture means is known to those familiar with the art and may include a CCD (charge coupled device) to facilitate digital recording. If a flash is to be used, exposure control means 30 causes the flash means 70 to generate a photographic flash in substantial coincidence with the recording of the image by image capture means 60. The flash may be selectively generated either in response to the light sensor 40 or a manual input from the user of the camera. The image recorded by image capture means 60 is stored in image store means 80 which may comprise computer memory such a dynamic random access memory or a nonvolatile memory. The red-eye filter 90 then analyzes the stored image for characteristics of red-eye, and if found, modifies the image and removes the red-eye phenomenon from the photograph as will be describe in more detail. The red-eye filter includes a pixel locator 92 for locating pixels having a color indicative of red-eye; a shape analyzer 94 for determining if a grouping of at least a portion of the pixels located by the pixel locator comprise a shape indicative of red-eye; a pixel modifier 96 for modifying the color of pixels within the grouping; and an falsing analyzer 98 for further processing the image around the grouping for details indicative of an image of an eye. The modified image may be either displayed on image display 100 or downloaded to another display device, such as a personal computer or printer via image output means 110. It can be appreciated that many of the processes implemented in the digital camera may be implemented in or controlled by software operating in a microcomputer (μC) or digital signal processor (DSP) and/or an application specific integrated circuit (ASIC).

Figure 2:
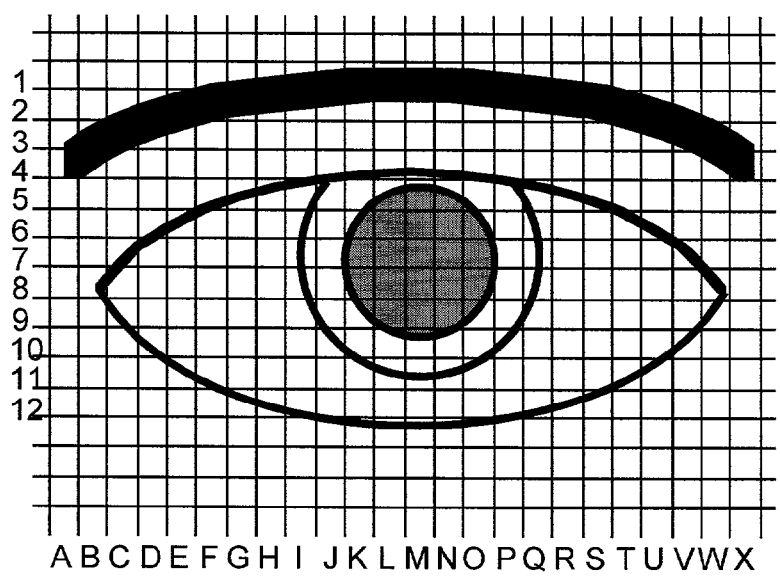
FIG. 2 shows a pixel grid upon which an image of an eye is focused.

FIG. 2 shows a pixel grid upon which an image of an eye is focused. Preferably the digital camera records an image comprising a grid of pixels at least 640 by 480. FIG. 2 shows a 24 by 12 pixel portion of the larger grid labeled columns A–X and rows 1–12 respectively.

Figure 3:
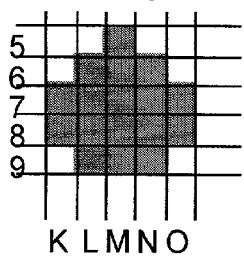
FIG. 3 shows pixel coordinates of the pupil of FIG. 2.

FIG. 3 shows pixel coordinates of the pupil of FIG. 2. The pupil is the darkened circular portion and substantially includes seventeen pixels: K7, K8, L6, L7, L8, L9, M5, M6, M7, M8, M9, N6, N7, N8, N9, O7 and O8, as indicated by shaded squares at the aforementioned coordinates. In a non-flash photograph, these pupil pixels would be substantially black in color. In a red-eye photograph, these pixels would be substantially red in color. It should be noted that the aforementioned pupil pixels have a shape indicative of the pupil of the subject, the shape preferably being a substantially circular, semi-circular or oval grouping of pixels. Locating a group of substantially red pixels forming a substantially circular or oval area is useful by the red-eye filter.

Figure 4:
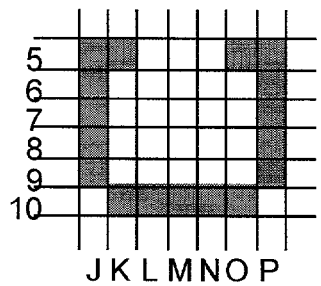
FIG. 4 shows pixel coordinates of the iris of FIG. 2.

FIG. 4 shows pixel coordinates of the iris of FIG. 2. The iris pixels are substantially adjacent to the pupil pixels of FIG. 2. Iris pixels J5, J6, J7, J8, J9, K5, K10, L10, M10, N10, O5, O10, P5, P6, P7, P8 and P9 are indicated by shaded squares at the aforementioned coordinates. The iris pixels substantially surround the pupil pixels and may be used as further indicia of a pupil. In a typical subject, the iris pixels will have a substantially constant color. However, the color will vary as the natural color of the eyes each individual subject varies. The existence of iris pixels depends upon the size of the iris at the time of the photograph, if the pupil is very large then iris pixels may not be present.

Figure 5:
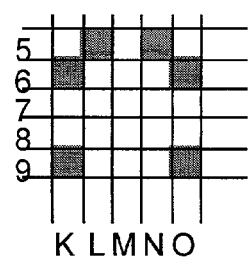
FIG. 5 shows pixel coordinates which contain a combination of iris and pupil colors of FIG. 2.

FIG. 5 shows pixel coordinates which include a combination of iris and pupil colors of FIG. 2. The pupil/iris pixels are located at K6, K9, L5, N5, O6, and O9, as indicated by shaded squares at the aforementioned coordinates. The pupil/iris pixels are adjacent to the pupil pixels, and also adjacent to any iris pixels which may be present. Pupil/iris pixels may also contain colors of other areas of the subject's eyes including skin tones and white areas of the eye.

Figure 6:
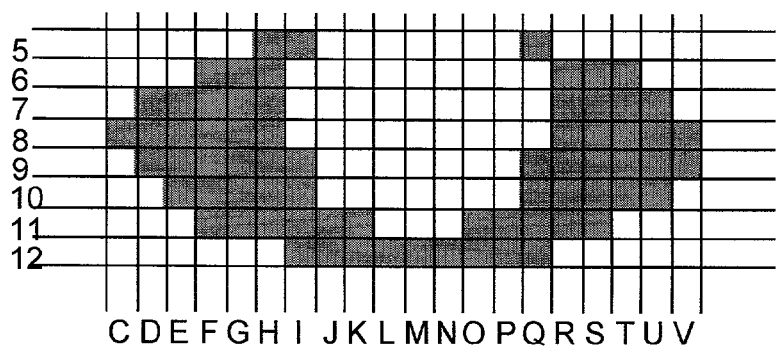
FIG. 6 shows pixel coordinates of the white eye area of FIG. 2.

FIG. 6 shows pixel coordinates of the white eye area of FIG. 2. The seventy one pixels are indicated by the shaded squares of FIG. 6 and are substantially white in color and are in the vicinity of and substantially surround the pupil pixels of FIG. 2.

Figure 7:
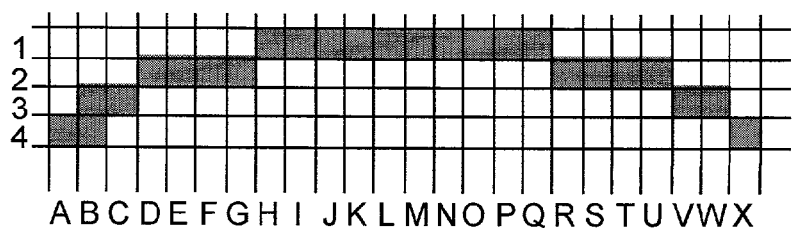
FIG. 7 shows pixel coordinates of the eyebrow area of FIG. 2.

FIG. 7 shows pixel coordinates of the eyebrow area of FIG. 2. The pixels are indicated by the shaded squares of FIG. 7 and are substantially white in color. The eyebrow pixels substantially form a continuous line in the vicinity of the pupil pixels. The color of the line will vary as the natural color of the eyebrow of each individual subject varies. Furthermore, some subjects may have no visible eyebrow at all.

It should be appreciated that the representations of FIG. 2 through FIG. 7 are particular to the example shown. The coordinates of pixels and actual number of pixels comprising the image of an eye will vary depending upon a number of variables. These variables include the location of the subject within the photograph, the distance between the subject and the camera, and the pixel density of the camera.

The red-eye filter 90 of FIG. 1 searches the digitally stored image for pixels having a substantially red color, then determines if the grouping has a round or oval characteristics, similar to the pixels of FIG. 3. If found, the color of the grouping is modified. In the preferred embodiment, the color is modified to black.

Searching for a circular or oval grouping helps eliminate falsely modifying red pixels which are not due to the red-eye phenomenon. In the example of FIG. 2, the red-eye phenomenon is found in a 5×5 grouping of pixels of FIG. 3. In other examples, the grouping may contain substantially more or less pixels depending upon the actual number of pixels comprising the image of an eye, but the color and shape of the grouping will be similar. Thus for example, a long line of red pixels will not be falsely modified because the shape is not substantially round or oval.

Additional tests may be used to avoid falsely modifying a round group of pixels having a color indicative of the red-eye phenomenon by further analysis of the pixels in the vicinity of the grouping. For example, in a red-eye phenomenon photograph, there will typically be no other pixels within the vicinity of a radius originating at the grouping having a similar red color because the pupil is surrounded by components of the subject's face, and the red-eye color is not normally found as a natural color on the face of the subject. Preferably the radius is large enough to analyze enough pixels to avoid falsing, yet small enough to exclude the other eye of the subject, which may also have the red-eye phenomenon. Preferably, the radius includes a range between two and five times the radius of the grouping. Other indicia of the recording may be used to validate the existence of red-eye including identification of iris pixels of FIG. 4 which surround the pupil pixels. The iris pixels will have a substantially common color, but the size and color of the iris will vary from subject to subject. Furthermore, the white area of the eye may be identified as a grouping of substantially white pixels in the vicinity of and substantially surrounding the pupil pixels as shown in FIG. 6. However, the location of the pupil within the opening of the eyelids is variable depending upon the orientation of the head of the subject at the time of the photograph. Consequently, identification of a number of substantially white pixels in the vicinity of the iris without a requirement of surrounding the grouping will further validate the identification of the red-eye phenomenon and prevent false modification of other red pixel groupings. The number of substantially white pixels is preferably between two and twenty times the number of pixels in the pupil grouping. As a further validation, the eyebrow pixels of FIG. 7 can be identified.

Further, additional criterion can be used to avoid falsely modifying a grouping of red pixels. The criterion include determining if the photographic conditions were indicative of the red-eye phenomenon. These include conditions known in the art including use of a flash, ambient light levels and distance of the subject. If the conditions indicate the red-eye phenomenon is not present, then red-eye filter 90 is not engaged.

FIG. 5 shows combination pupil/iris pixels which have color components of the red-eye phenomenon combined with color components of the iris or even the white area of the eye. The invention modifies these pixels by separating the color components associated with red-eye, modifying color of the separated color components and then adding back modified color to the pixel. Preferably the modified color is black. The result of modifying the red component with a black component makes for a more natural looking result. For example, if the iris is substantially green, a pupil/iris pixel will have components of red and green. The red-eye filter removes the red component and substitutes a black component, effectively resulting in a dark green pixel.

Figure 8:
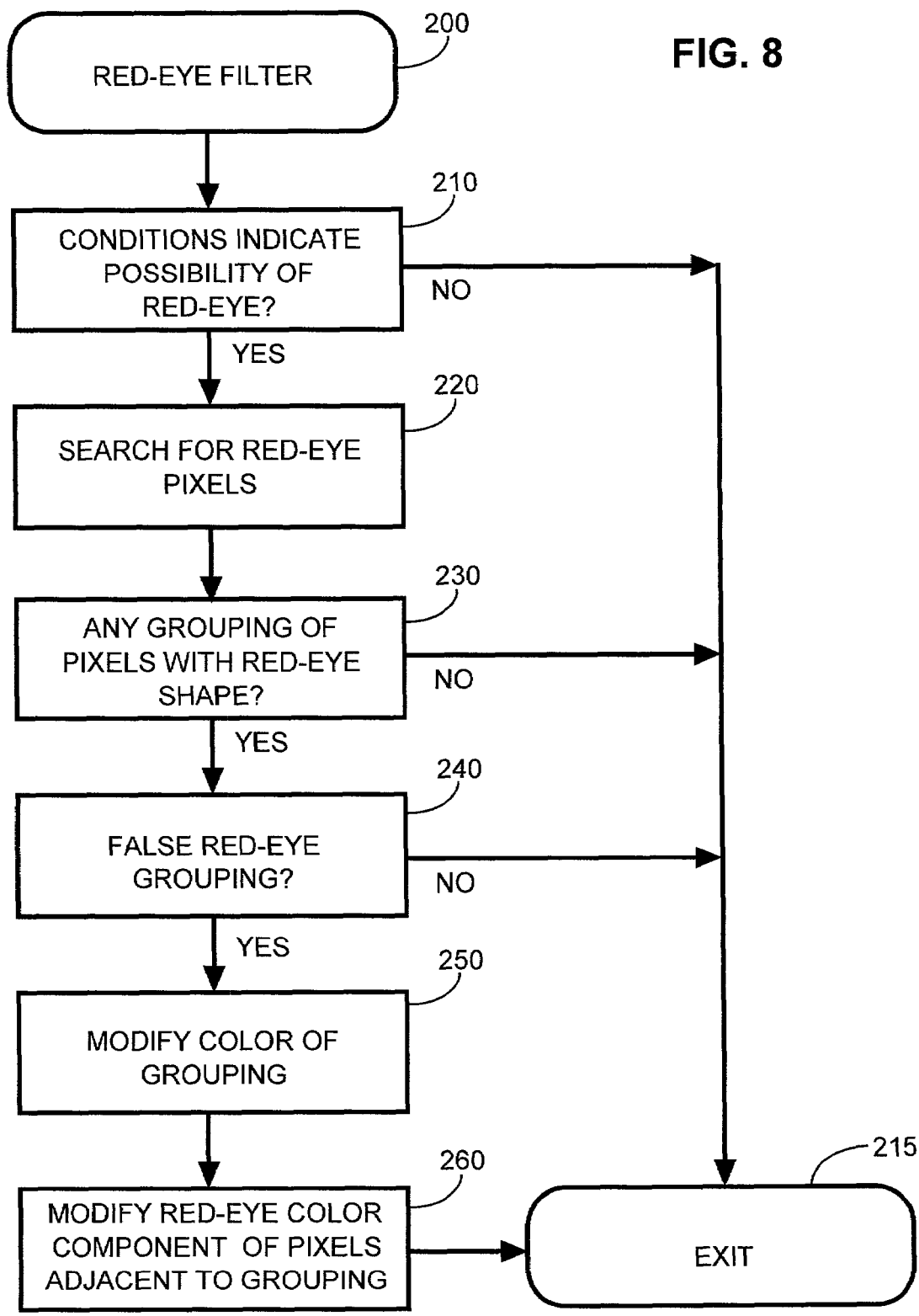
FIG. 8 shows a flow chart of a method operating in accordance with the present invention.

FIG. 8 shows a flow chart of a method operating in accordance with the present invention. The red-eye filter process is in addition to other processes known to those skilled in the art which operate within the camera. These other processes include flash control, focus, and image recording, storage and display. The red-eye filter process preferably operates within software within a μC or DSP and processes an image stored in image store 80. The red-eye filter process is entered at step 200. At step 210 conditions are checked for the possibility of the red-eye phenomenon. These conditions are included in signals from exposure control means 30 which are communicated directly to the red-eye filter. Alternatively the exposure control means may store the signals along with the digital image in image store 80. If conditions do not indicate the possibility of red-eye at step 210, then the process exits at step 215. Step 210 is further detailed in FIG. 9, and is an optional step which may be bypassed in an alternate embodiment. Then is step 220 the digital image is searched of pixels having a color indicative of red-eye. The grouping of the red-eye pixels are then analyzed at step 230. Red-eye is determined if the shape of a grouping is indicative of the red-eye phenomenon. This step also accounts for multiple red-eye groupings in response to a subject having two red-eyes, or multiple subjects having red-eyes. If no groupings indicative of red-eye are found, then the process exits at step 215. Otherwise, false red-eye groupings are checked at optional step 240. Step 240 is further detailed in FIG. 10 and prevents the red-eye filter from falsely modifying red pixel groupings which do not have further indicia of the eye of a subject. After eliminating false groupings, if no grouping remain, the process exits at step 215. Otherwise step 250 modifies the color of the groupings which pass step 240, preferably substituting the color red for the color black within the grouping. Then in optional step 260, the pixels surrounding a red-eye grouping are analyzed for a red component. These are equivalent to the pixels of FIG. 5. The red component is substituted for black by the red-eye filter. The process then exits at step 215.

It should be appreciated that the pixel color modification can be stored directly in the image store by replacing red-eye pixels with pixels modified by the red-eye filter. Alternately the modified pixels can be stored as an overlay in the image store, thereby preserving the recorded image and only modifying the image when displayed in image display 100. Preferably the filtered image is communicated through image output means 110. Alternately the unfiltered image with the overlay may be communicated through image output means 110 to a external device such as a personal computer capable of processing such information.

Figure 9:
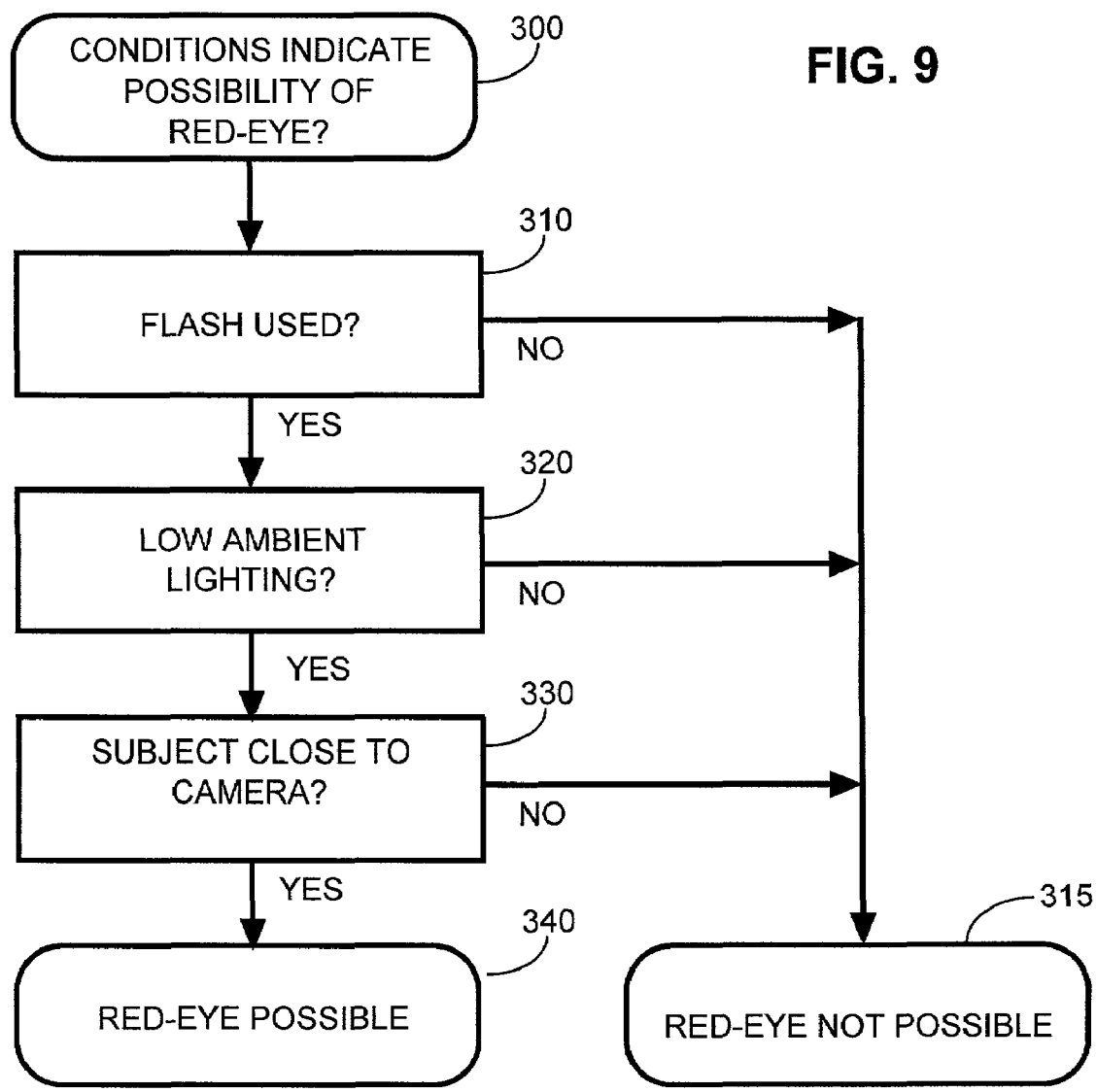
FIG. 9 shows a flow chart for testing if conditions indicate the possibility of a red-eye phenomenon photograph.

FIG. 9 shows a flow chart for testing if conditions indicate the possibility of a red-eye phenomenon corresponding to step 210 of FIG. 8. Entered at step 300, step 310 checks if a flash was used in the photograph. If not, step 315 indicates that red-eye is not possible. Otherwise optional step 320 checks if a low level of ambient light was present at the time of the photograph. If not, step 315 indicates that red-eye is not possible. Otherwise optional step 330 checks if the subject is relatively close to the camera at the time of the photograph. If not, step 215 indicates that red-eye is not possible. Otherwise step 340 indicates that red-eye is possible.

Figure 10:
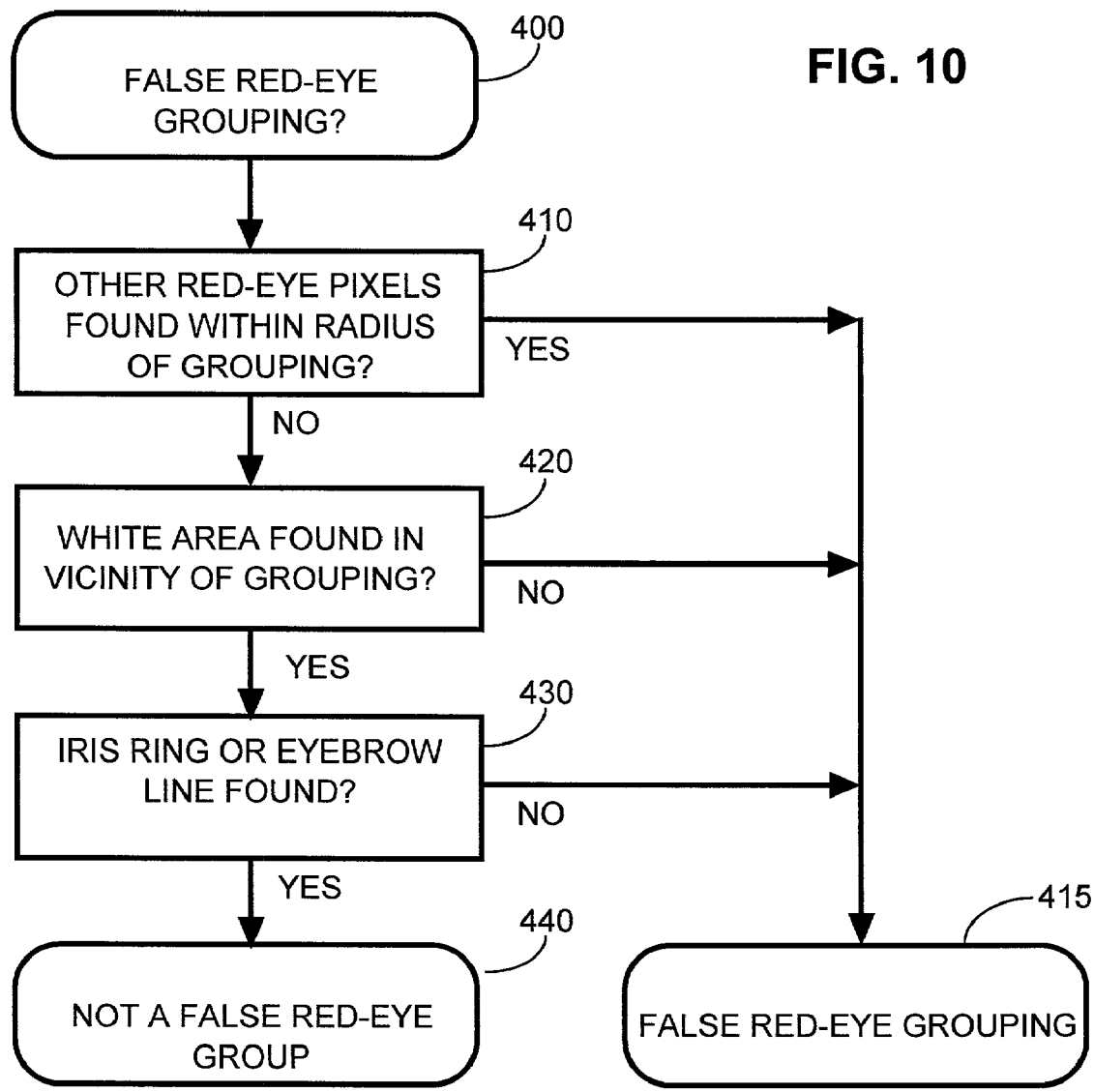
FIG. 10 shows a flow chart for testing if conditions indicate a false red-eye grouping.

FIG. 10 shows a flow chart for testing if conditions indicate a false red-eye grouping corresponding to step 240 of FIG. 8. Entered at step 400, step 410 checks if other red-eye pixels are found within a radius of a grouping. Preferably the radius is between two and five times the radius of the grouping. If found step 415 indicates a false red-eye grouping. Otherwise step 420 checks if a substantially white area of pixels is found in the vicinity of the grouping. This area is indicative of the white area of a subject's eye and has preferably between two and twenty times the number of pixels in the grouping. If not found step 415 indicates a false red-eye grouping. Otherwise step 430 searches the vicinity of the grouping for an iris ring or an eyebrow line. If not found, step 415 indicates a false red-eye grouping. Otherwise step 440 indicates the red-eye grouping is not false. It should be appreciated that each of the tests 410, 420 and 430 check for a false red-eye grouping. In alternate embodiments, other tests may be used to prevent false modification of the image, or the tests of FIG. 10 may be used either alone or in combination.

It should be further appreciated that either the red-eye condition test 210 or the red-eye falsing test 240 of FIG. 8 may be used to achieve satisfactory results. In an alternate embodiment test 240 may be acceptable enough to eliminate test 210, or visa versa. Alternately the selectivity of either the color and/or grouping analysis of the red-eye phenomenon may be sufficient to eliminate both tests 210 and 240 of FIG. 8. Furthermore, the color red as used herein means the range of colors and hues and brightnesses indicative of the red-eye phenomenon, and the color white as used herein means the range of colors and hues and brightnesses indicative of the white area of the human eye.

Thus, what has been provided is a method and apparatus for eliminating red-eye phenomenon within a miniature digital camera having a flash without the distraction of a pre-flash.

I claim:

1. A digital apparatus having no photographic film, comprising:
    (a) a source of light for providing illumination during image acquisition;
    (b) a digital image detector for acquiring an image; and
    (c) a red-eye filter for modifying pixels within the image indicative of a red-eye phenomenon.

2. A digital apparatus having no photographic film as cited in claim 1, wherein said apparatus is portable.

3. A digital apparatus having no photographic film as cited in claim 1, wherein said source of light is an integral flash unit.

4. The apparatus according to claim 1, further comprising memory for saving said acquired image after applying said filter for said modifying pixels as a modified image.

5. The apparatus according to claim 4, wherein said modified pixels are stored directly in said image by replacing said pixels within the image indicative of red-eye phenomenon to create said modified image.

6. The apparatus according to claim 4, wherein said modified pixels are stored as an overlay of said image thus preserving the original said image.

7. The apparatus according to claim 4, wherein said modified pixels are stored as instruction sets of said image thus preserving the original said image.

8. The apparatus according to claim 5, wherein said modified pixels are processed by an external device.

9. The apparatus according to claim 8, wherein said external device is a personal computer.

10. The apparatus according to claim 8, wherein said external device is a computing appliance.

11. The apparatus according to claim 8, wherein said external device is a printer.

12. The apparatus according to claim 1, further comprising an integral image display for displaying the modified image.

13. The apparatus according to claim 1, further comprising an image output capability for downloading said modified image for printing.

14. The apparatus according to claim 1 wherein the pixels indicative of the red-eye phenomenon have a color and shape indicative of the red-eye phenomenon and the image is modified to change the color to an at least substantially dark color, and further wherein:

said light source provides illumination during image acquisition; and said red-eye filter is enabled to modify the image in response to said source of light providing illumination during image acquisition.

15. The apparatus according to claim 14, further comprising an exposure control means for determining if the image was acquired in a condition conducive to the red-eye phenomenon and for generating a red-eye indicator in response thereto, wherein said red-eye filter is further enabled in response to the red-eye indicator.

16. The apparatus according to claim 1, wherein said red-eye filter further includes a false-detection avoidance apparatus which enables modification of the pixels indicative of the red-eye phenomenon in response to an absence of color indicative of the red-eye phenomenon within a vicinity of and exclusive to the pixels.

17. The apparatus according to claim 1, wherein said red-eye filter further includes a false-detection avoidance apparatus which disables modification of the pixels indicative of the red-eye phenomenon in response to an absence of one or more of a substantially white colored region, an iris ring and an eyebrow line within a vicinity of the area.

18. The apparatus according to claim 1, wherein said red-eye filter detects said pixels within the image indicative of a red-eye phenomenon based on one or more of a substantially white colored region, an iris ring and an eyebrow line within a vicinity of the area around said pixels indicative of said red-eye phenomenon.

19. The apparatus according to claim 1, wherein said red-eye filter comprises:

a pixel locator for locating pixels having a color indicative of the red-eye phenomenon;

a shape analyzer for determining if a grouping of at least a portion of the pixels located by said pixel locator comprise a shape indicative of the red-eye phenomenon; and a pixel modifier for modifying the color of the pixels within the grouping.

20. The apparatus according to claim 19, further comprising a false-detection analyzer for further processing the image in a vicinity of the grouping for details indicative of an eye, and for enabling said pixel modifier in response thereto.

21. The apparatus according to claim 19, further comprising an exposure analyzer for determining if the image was acquired in a condition indicative of the red-eye phenomenon.

22. The apparatus according to claim 21, wherein said exposure analyzer for determining if the image was acquired in a condition indicative of the red-eye phenomenon including determining whether said light source was used during image acquisition.

23. The apparatus according to claim 21, wherein said exposure analyzer for determining if the image was acquired in a condition indicative of the red-eye phenomenon includes determining whether low ambient lighting conditions existed during image acquisition.

24. The apparatus according to claim 19, further comprises a distance analyzer for determining if the distance of the subject to the apparatus during image acquisition is indicative of said red-eye phenomenon.

25. Within a digital apparatus, a method of filtering a red-eye phenomenon from a digital image comprising a multiplicity of pixels indicative of color, the pixels forming various shapes of the image, the method comprising the steps of:

(a) detecting a digital image;

(b) locating pixels having a color indicative of a red-eye phenomenon;

(c) determining a grouping of pixels having one or more features indicative of the red-eye phenomenon; and (d) modifying the color of the grouping in response to said determining step.

26. The method of claim 25, the determining step including locating pixels having a color indicative of the red-eye phenomenon.

27. The method of claim 26, the determining step further including determining if a grouping of at least a portion of the pixels of said step locating comprise a shape indicative of the red-eye phenomenon.

28. The method of claim 25, further comprising the step of displaying the image upon the apparatus in response to said step of modifying.

29. The method of claim 25, the acquisition step not being performed in conjunction with a pre-flash.

30. A method of filtering a red-eye phenomenon from a digital image comprising a multiplicity of pixels indicative of color, the pixels forming various shapes of the image, the method comprising the steps of:

(a) determining a grouping of pixels having one or more features indicative of the red-eye phenomenon;

(b) determining if pixels in a vicinity of the grouping have one or more features indicative of an eye; and (c) in response to an absence of the one or more features, inhibiting a step of modifying of the color of the grouping in response to said grouping determining step.

31. The method according to claim 30, wherein the one or more features include an absence of additional pixels having a color indicative of the red-eye phenomenon within the vicinity of the grouping.

32. The method according to claim 30, wherein the one or more features include a substantially white area within the vicinity of the grouping.

33. The method according to claim 30, wherein the one or more features include an eyebrow line within the vicinity of the grouping.

34. The method according to claim 30, wherein the one or more features include an iris ring within the vicinity of the grouping.

35. The method according to claim 30, the grouping determining step including locating pixels having a color indicative of the red-eye phenomenon.

36. The method of claim 35, the grouping determining step further comprising the step of determining if a grouping of at least a portion of the pixels comprises a shape indicative of the red-eye phenomenon.

37. The method according to claim 35, further comprising a step of acquiring the digital image, said grouping determining step including said shape and pixel color determining, and the inhibiting step, being performed in response to the acquisition step.

38. The method according to claim 37, the modifying step not being performed wherein said response to the acquisition step of said inhibiting step is the absence of flash in said acquisition step.

39. Within a digital apparatus having no photographic film, a method of filtering a red-eye phenomenon from a digital image comprising a multiplicity of pixels indicative of color, the pixels forming various shapes of the image, the method comprising the steps of:
  (a) digitally detecting the image;
  (b) determining a grouping of pixels having one or more features indicative of the red-eye phenomenon;
  (c) modifying the color of the grouping in response to said step of determining; and
  (d) said determining and modifying steps having been performed in response to said detecting step, displaying the image upon the apparatus in response to said step of modifying.

40. The method according to claim 39, the grouping determining step including locating pixels having a color indicative of the red-eye phenomenon.

41. The method of claim 40, the grouping determining step further including determining if a grouping of at least a portion of the pixels of said grouping determining step comprise a shape indicative of the red-eye phenomenon.

42. A method of filtering a red-eye phenomenon from a digital image comprising a multiplicity of pixels indicative of color, the pixels forming various shapes of the image, the method comprising the steps of:
  (a) determining a grouping of pixels having one or more features indicative of the red-eye phenomenon;
  (b) analyzing if one or more conditions of detection of the image are indicative of the red-eye phenomenon, at least including determining if a flash was used in conjunction with the acquisition of the image, said flash having been used or not in response to at least one of a light sensor of ambient brightness and a manual input from a user; and
  (c) modifying the color of the grouping in response to said determining and analyzing steps only if said flash was used when the image was acquired.

43. The method according to claim 42, the grouping determining step including locating pixels having a color indicative of the red-eye phenomenon.

44. The method according to claim 43, the grouping determining step further including determining if a grouping of at least a portion of the pixels of said grouping determining step comprise a shape indicative of the red-eye phenomenon.

45. The method according to claim 44, further comprising the step of recording the digital image, said grouping determining step including said color locating and shape determining steps, and said inhibiting step, being performed in response to the acquisition step.

46. The method according to claim 45, the recording step not being performed in conjunction with a pre-flash.

47. The method according to claim 42, the grouping determining step including determining if a grouping of at least a portion of the pixels of said locating step comprise a shape indicative of the red-eye phenomenon.

48. Within a portable digital image acquisition apparatus having no photographic film, a method of filtering a red-eye phenomenon from a digital image comprising a multiplicity of pixels indicative of color, the pixels forming various shapes of the image, the method comprising the steps of:
  (a) locating pixels having a color indicative of the red-eye phenomenon;
  (b) determining if a grouping of at least a portion of the pixels of said step locating comprise a shape indicative of the red-eye phenomenon;
  (c) modifying the color of the grouping in response to said step of determining; and
  (d) analyzing if conditions of acquiring of the image are indicative of the red-eye phenomenon, wherein said step of modifying is selectively performed in response thereto.

49. The method according to claim 48, wherein the color indicative of the red-eye phenomenon corresponds to a substantially red color, and the shape indicative of the red-eye phenomenon corresponds to a substantially round, semi-circular or oval shape.

50. The method according to claim 48, wherein said step of analyzing includes determining if a flash was used in conjunction with the acquiring of the image.

51. The method according to claim 48, wherein said step of analyzing includes determining if a flash was used in conjunction with the acquiring of the image, the distance between a subject of the image and the digital image acquisition apparatus for recording the image and an ambient light level during the acquisition of the image.

52. The method according to claim 48, wherein said step of modifying changes the color of the grouping to substantially dark color.

53. The method according to claim 48, wherein said step of determining further comprises the steps of:
  determining if pixels in a vicinity of the grouping have a feature indicative an eye;
  and inhibiting said step of modifying in response to an absence of the feature.

54. The method according to claim 53, wherein the feature includes an absence of additional pixels having a color indicative of the red-eye phenomenon within the vicinity of the grouping.

55. The method according to claim 53, wherein the feature includes a substantially white area within the vicinity of the grouping.

56. The method according to claim 48, wherein the portable digital image acquisition apparatus includes an integral flash and an electronic display, said method further comprising the steps of:
  initiating a photographic flash by the flash;
  digitally acquiring the image in response to said step of initiating;
  performing said steps of locating, determining and modifying in response to said acquisition step; and
  displaying the image in response to said step of modifying on the electronic display.

57. A portable digital image acquisition apparatus and printer system having no photographic film, comprising:
  (a) a digital image capturing apparatus including an integral flash and image output means for downloading image data to another device; and
  (b) a printer coupled with the digital image capturing apparatus at the image output means for receiving the image data,
  (c) the system including a red-eye filter for modifying areas within images indicative of red-eye phenomenon, such that the printer prints red-eye corrected images.

58. The system of claim 57, the portable digital image capturing apparatus comprising a portable digital camera.

59. A portable digital image acquisition apparatus and printer system having no photographic film, comprising:

(a) a digital image capturing apparatus including an integral flash and image output means for downloading image data to another device; and (b) a printer coupled with the digital image capturing apparatus camera at the image output means for receiving the image data, (c) the system including a red-eye filter for correcting red-eye phenomenon, such that the printer prints red-eye corrected images.

60. The system of claim 59, the portable digital image capturing apparatus comprising a portable digital camera.

61. A portable digital image acquisition apparatus and printer system having no photographic film, comprising:

(a) an integral flash for providing illumination during image recording;

(b) a digital image capturing apparatus for recording an image;

(c) image output means for downloading image data to a printer for printing;

(d) a red-eye filter for modifying an area within the image indicative of a red-eye phenomenon; and (e) the printer.

62. The system of claim 61, the portable digital image acquisition apparatus comprising a portable digital camera.

63. A portable digital image acquisition apparatus and printer system having no photographic film, comprising:

(a) an integral flash for providing illumination during image recording;

(b) a digital image capturing apparatus for recording an image;

(c) image output means for downloading image data to a printer for printing;

(d) a red-eye filter for correcting a red-eye phenomenon; and (e) the printer.

64. The system of claim 63, the portable digital image acquisition apparatus comprising a portable digital camera.

65. A portable digital image acquisition apparatus and printer system having no photographic film, comprising:

(a) an integral flash for providing illumination during image recording;

(b) a digital image capturing apparatus for recording an image;

(c) a red-eye filter for modifying an area within the image indicative of a red-eye phenomenon; and (d) a printer for printing the image.

66. The system of claim 65, the portable digital image acquisition apparatus comprising a portable digital camera.

67. A portable digital image acquisition apparatus and printer system having no photographic film, comprising:

(a) an integral flash for providing illumination during image recording;

(b) a digital image capturing apparatus for recording an image;

(c) a red-eye filter for correcting a red-eye phenomenon; and (d) a printer for printing a red-eye corrected image.

68. The system of claim 67, the portable digital image acquisition apparatus comprising a portable digital camera.

* * * * *